May 6, 1947.    F. KASTEL    2,419,951
SEALING COMPOUND APPLYING APPARATUS
Filed March 3, 1945    4 Sheets-Sheet 1

INVENTOR.
Ferdinand Kastel.
BY
Mason, Porter & Diller
ATTORNEYS

May 6, 1947.  F. KASTEL  2,419,951
SEALING COMPOUND APPLYING APPARATUS
Filed March 3, 1945  4 Sheets-Sheet 3

INVENTOR.
Ferdinand Kastel.
BY
Mason, Porter & Diller
ATTORNEYS

May 6, 1947.　　　　F. KASTEL　　　　2,419,951
SEALING COMPOUND APPLYING APPARATUS
Filed March 3, 1945　　　4 Sheets-Sheet 4
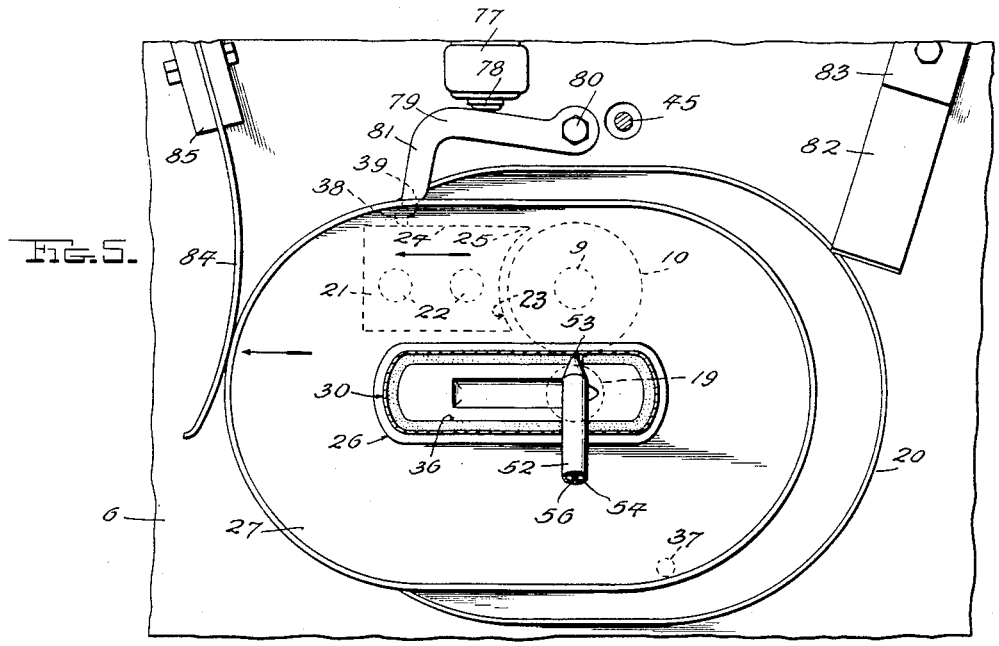
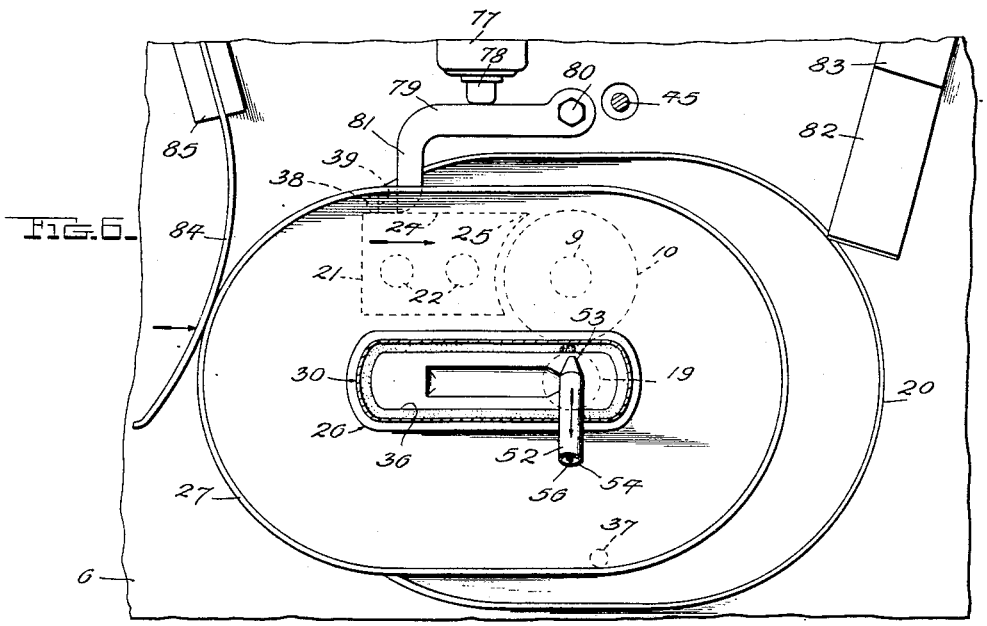
INVENTOR.
Ferdinand Kastel.
BY
Mason, Porter & Diller
ATTORNEYS Patented May 6, 1947

2,419,951

UNITED STATES PATENT OFFICE 2,419,951

SEALING COMPOUND APPLYING APPARATUS

Ferdinand Kastel, Baltimore, Md., assignor to Continental Can Company, Inc., New York, N. Y., a corporation of New York Application March 3, 1945, Serial No. 580,896

18 Claims. (Cl. 91—43)

The invention relates to apparatus for applying sealing compound to closure members adapted to be attached to containers or the like, and it primarily seeks to provide a novel form of such apparatus capable of rapidly and efficiently applying sealing compound to closure members which are of irregular, non-circular shape, although certain features of the invention are novel without limitation to the particular shape of closure to which the compound is to be applied.

In the manufacture of containers it is common practice to apply closures to the container bodies and to provide each said closure with a ring of sealing compound so placed as to engage an edge or flange about the open top of the container body in a manner for efficiently sealing the same. The placement of the sealing compound ring in the closures with proper regularity and symmetry, and without voids, presents problems which often are difficult of solution, and these problems are accentuated when the closures are irregular in shape such as square with rounded corners, oval or oblong, as distinguished from the more common circular form of closure. It is the purpose of the present invention to provide a simple and inexpensively constructed apparatus capable of accomplishing the purposes stated with efficiency and dispatch.

An object of the invention is to provide an apparatus of the character stated which will apply the sealing compound in a properly placed continuous ring to individual closure members during individual, manually initiated, automatically terminated operating cycles.

Another object of the invention is to provide an apparatus of the character stated in which there are included a chuck having a gear rack thereon conforming generally to the shape of the ring of sealing compound to be applied to a closure carried by the chuck, a driving pinion, means for removably retaining the chuck rack in mesh with the pinion, a sealing compound depositing nozzle associated with the chuck for depositing a ring of sealing compound on a cover carried by the chuck as it is moved about by the pinion, and means for driving the pinion.

Another object of the invention is to provide in apparatus of the character stated means for manually initiating rotation of the pinion and the depositing of sealing compound on a closure carried by the chuck, and means for automatically discontinuing rotation of the pinion and the depositing of sealing compound after a complete ring of sealing compound has been deposited on said closure.

Another object of the invention is to provide novel means for causing the chuck and a closure to overrun slightly or turn slightly more than a complete turn and then reverse its direction a short distance in each operation cycle, thereby to assure that a complete ring of sealing compound will be deposited, without voids and with a slight overlap at the point at which the depositing of the sealing compound is initiated and terminated, and also to return the chuck to the same definite starting point after each sealing compound applying cycle.

Another object of the invention is to provide in an apparatus of the character stated a novel chuck structure having provision for magnetically retaining the closure members as they are having the sealing compound deposited thereon.

With the above and other objects in view that will hereinafter appear, the nature of the invention will be more clearly understood by reference to the following detailed description, the appended claims, and the several views illustrated in the accompanying drawing.

In the drawings:

Figure 5 is a plan view similar to Figure 4 illustrating the manner of actuating the control devices for terminating the application of the sealing compound.

Figure 6 is a plan view similar to Figure 5 illustrating how a limited amount of reverse direction movement is imparted to the closure member holding chuck in providing a slight overlapping of the sealing compound.

Figure 1:
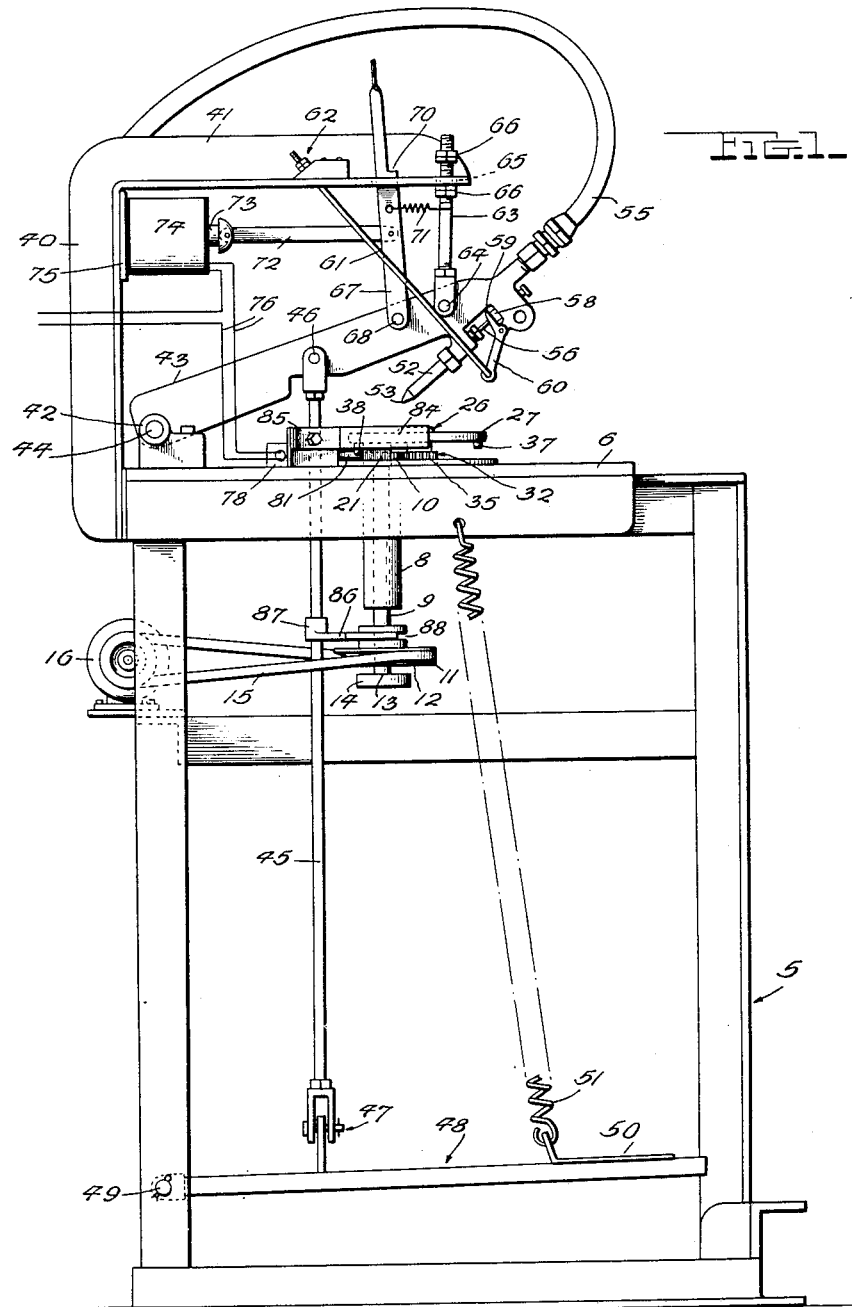
Figure 1 is a left side elevation illustrating an apparatus embodying the invention.

In the example of embodiment of the invention herein disclosed, there is included a base frame 5 whereon is mounted a bed or table portion 6. To the bottom of the table 6, a bearing bracket 7 is secured, and the bearing sleeve 8 which depends from this bracket provides a rotatable mounting for the driver shaft 9. A driver pinion 10 is fixed on the shaft immediately above the table 6, and at the lower end of said shaft a pulley wheel 11 is freely-rotatably mounted.

In order to provide for a suitable driving of the pinion 10, the pulley wheel 11 is provided with a clutch face 12 which is engageable with a clutch face 13 on a driver head 14 fixed on the shaft 9. The pulley wheel 11 is driven by a belt 15 from a motor 16 supported on the base frame. See Figure 1.

A headed stud 17 is rigidly secured as at 18 to the table 6 in position for projecting upwardly therefrom in spaced relation to the pinion 10. A roller 19 is freely rotatable about the stud 17 with the periphery thereof spaced a limited distance from the teeth of the pinion 10. A dam flange 20 is mounted on the table about the roller 19 and the pinion 10, and also about a guide block 21 which is rigidly secured on the table as at 22. The block includes an arcuate face disposed in closely spaced concentric relation to the pinion 10, and one edge portion of the block provides a guide surface 24 projecting tangentially with relation to the periphery of the pinion 10 in a vertical plane arranged in right angular relation to a vertical plane passing through the axes of the stud 17 and the shaft 9 on which the pinion 10 is mounted. It will be observed that the end of the guide face of the block terminates in a sharp receiving nose 25 adjacent the pinion 10, and the purpose of the roller 19, the pinion 10 and the block 21 will become apparent as this description progresses.

A chuck member 26 is provided and is secured to the upper face of a guard plate 27. The chuck member is shaped to conform to the shape of the closure members which are to be mounted thereon and preferably includes a seat groove 28 for receiving the rib-like edge portion 29 of one of the closure members designated 30, and said rib-like edge portion 29 provides a ring groove in which to receive the sealing compound. The closure members 30 may be removably attached to the chuck 26 in any approved manner, preferably by means of a permanent bar magnet 31.

A driver member 32 is fixed to and depends from the guard plate 27 and chuck 26, and said driver member is equipped at its under surface with a groove 33 for receiving the previously described roller 19. It will be apparent that the groove 33 includes straight side portions and rounded ends 34 and a rack periphery 35 of the same shape and disposed between the roller 19 and the driver pinion 10 and in mesh with the teeth of the latter. The rack portion 35 conforms generally to the shape of the closure member groove 36 in which the sealing compound is to be deposited, and it will be apparent that when the pinion 10 is rotated, the rack portion 35 and the chuck 26 will be moved so as to cause the groove 36 in the end closure 30 magnetically attached to the chuck to progressively pass over the space between the driver pinion 10 and the cooperating roller 19. A guide pin 37 depends from the guard plate at one side thereof, and a guide and control pin 38 having a flat trailing face 39 depends from said guard plate at a point diametrically opposite said pin 37. The pin 38 is longer than the pin 37 and the purpose of these pins will be described hereinafter.

A frame standard 40 extends upwardly above the top of the table portion 6 and carries an overhanging arm 41 extending over the table. A bearing 42 is mounted on the table top 6 and one end of a carrier lever 43 is pivoted as at 44 in said bearing. A depressor pitman 45 is connected as at 46 to the lever 43 intermediately of the ends thereof, and said pitman is connected as at 47 at its lower end to a treadle 48. The treadle is pivotally mounted at one end as at 49 on the frame. The treadle includes a foot plate 50, and an anchored spring 51 connected to said foot plate serves to normally hold the treadle and the lever 43 in elevated position.

The lever 43 carries a sealing compound dispensing nozzle 52 at its free end, and said nozzle includes a coniform nose 53 from which the sealing compound is dispensed through a duct 54 from a pressure supply conduit 55 under the control of a needle valve 56 which is spring pressed as at 57 to its closed position. The abutment 58 on the needle valve is engageable by an arm 59 of a bell crank lever 60 for effecting an opening of the nozzle to permit dispensing of sealing compound therefrom. The bell crank lever 60 is properly rocked for effecting an opening of the needle valve 56 on each depression of the lever 43 by reason of the connection therewith of an actuator rod 61, said rod being adjustably connected at 62 at its upper end with the overhanging arm 41. A stop rod 63 is secured as at 64 to the free end of the lever 43 and has its upper end passed through an aperture 65 in the overhanging arm and equipped with adjustable abutments 66 arranged above and below the flange of the overhanging arm so as to suitably limit upward and downward movement of the lever 43. The upper abutment means 66 is adjusted so as to place the sealing compound dispensing nozzle end in proper cooperative relation to the chuck 26 as illustrated in Figure 2, and the lower abutment means is properly spaced below the upper abutment means so as to limit upward movement of the lever 43 at a position with the sealing compound dispensing nozzle spaced a sufficient distance above the chuck so that it will not interfere with proper mounting and removal of the closure members on and from the chuck.

A hold-down lever or latch member 67 is pivoted as at 68 to the free end of the lever 43 and extends upwardly through an opening 69 in the overhanging arm 41. This latch member is provided with a latching shoulder 70 so spaced with relation to the pivotal mounting 68 of the latch member as to be effective to engage under the arm 41 in the manner illustrated in Figure 2 for holding the lever 43 and the nozzle 52 in cooperative relation with the chuck for applying sealing compound to a closure member carried thereon when the lever 43 has been lowered by depression of the treadle 48. A retractile spring 71 serves to pull the latch member 67 forwardly to cause the shoulder 70 to latch under the arm 41 in the manner stated as the lever 43 is depressed.

The latch member 67 is link connected as at 72 with the core 73 of a solenoid 74 which is mounted as at 75 on the frame standard 40. The solenoid is electrically connected as at 76 with a suitable source of electrical power and with a normal opened control switch generally designated 77. It will be apparent that each time the switch 77 is closed to complete the electrical circuits the solenoid will be energized, and the resulting retraction of the core 73 will release the shoulder 70 of the latch member 67 from its engagement under the overhanging arm 41 and permit the lever 43 to move upwardly and displace the nozzle 52 from the sealing compound depositing position illustrated in Figure 2. It will be apparent by reference to Figures 2, 3 and 5 of the drawings that the switch 77 includes a normally projecting actuator button 78 disposed in position for being pressed inwardly to complete the electrical circuit through the switch by an actuator lever 79 which is pivoted as at 80 on the table or bed 6 and includes an angle-bent end portion 81 presented for engagement by the control pin 38 which is movable with the chuck and carried by the guard plate 27. In the operation of the machine, the closure members are individually mounted on the chuck 26 with the sealing compound receiving groove forming rib portions 29 thereof engaged in the receiving groove 28 in the chuck, and removably retained in position by the permanent bar magnet 31. After the chuck unit has been selected according to the form of closure member to which the sealing compound is to be applied it remains in the position illustrated in the drawings, that is with the groove 33 in the under surface of the driver member mounted over the roller 19 and with the rack portion 35 thereof meshing with the driver pinion 10. The position of the chuck unit at the initiation of each sealing compound application cycle is illustrated in Figure 3, namely, with the flat trailing face 39 of the control pin 38 against the angle-bent end 81 of the actuator lever 79 and with said control pin against the guiding face 24 of the guide block 21.

Figure 2:
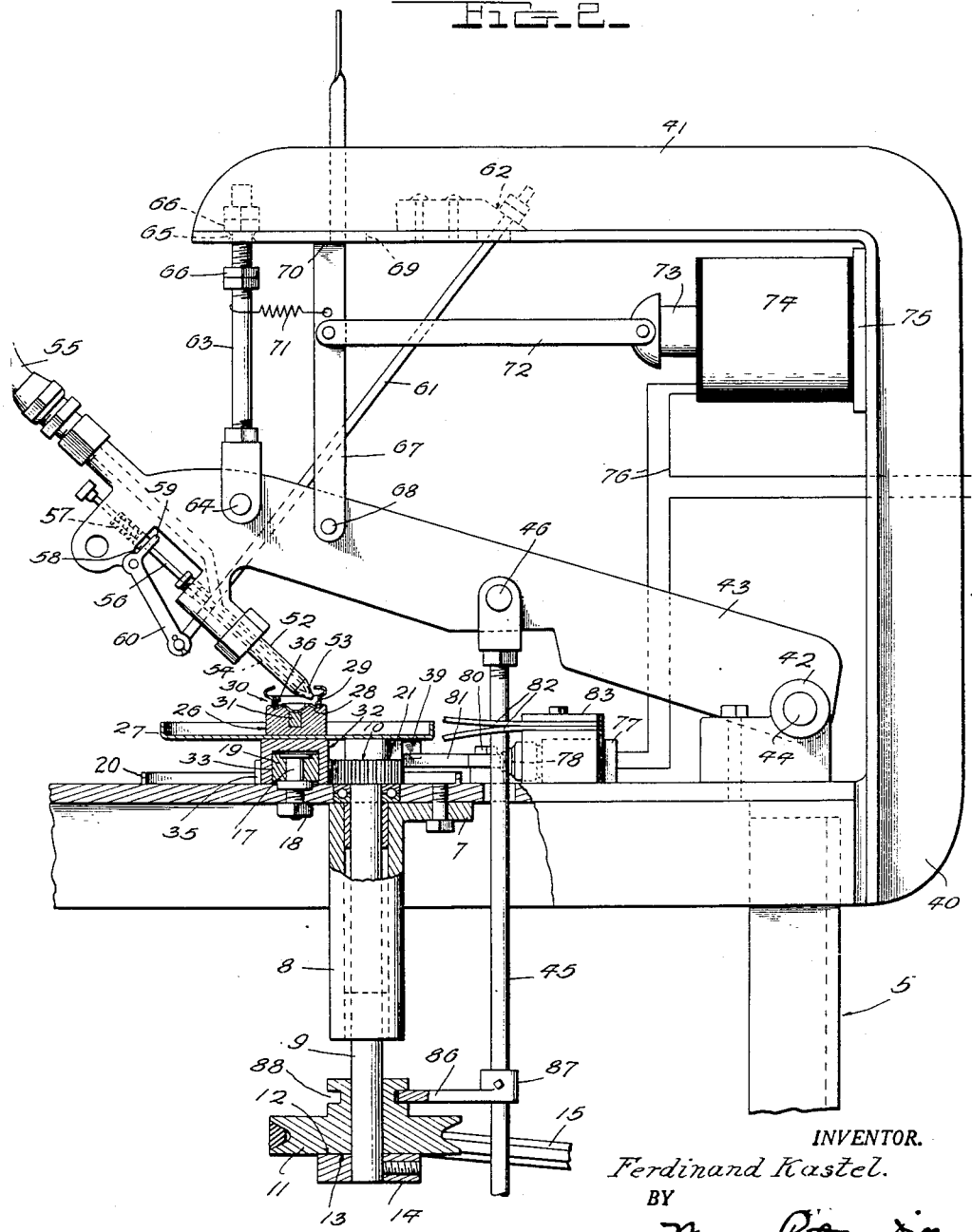
Figure 2 is an enlarged fragmentary right side elevation illustrating the apparatus in the process of applying sealing compound to a chuck supported closure member, parts being broken away and in section.

By now depressing the treadle 48 the pitman 45 will be lowered to effect a simultaneous lowering of the sealing compound applying nozzle 52 into the operative position illustrated in Figure 2 and the engagement of the clutch faces 13 and 12 so as to impart rotation to the driver pinion 10. The lowering of the nozzle 52 automatically opens the needle valve 56 by actuation of the rod 61 and the bell crank lever 60 to initiate the dispensing of the sealing compound, and the latch shoulder 70 engages under the overhanging arm 41 and secures the lever 43 and nozzle 52 in proper cooperative relation with the chuck 26 as illustrated in Figure 2.

Figure 3:
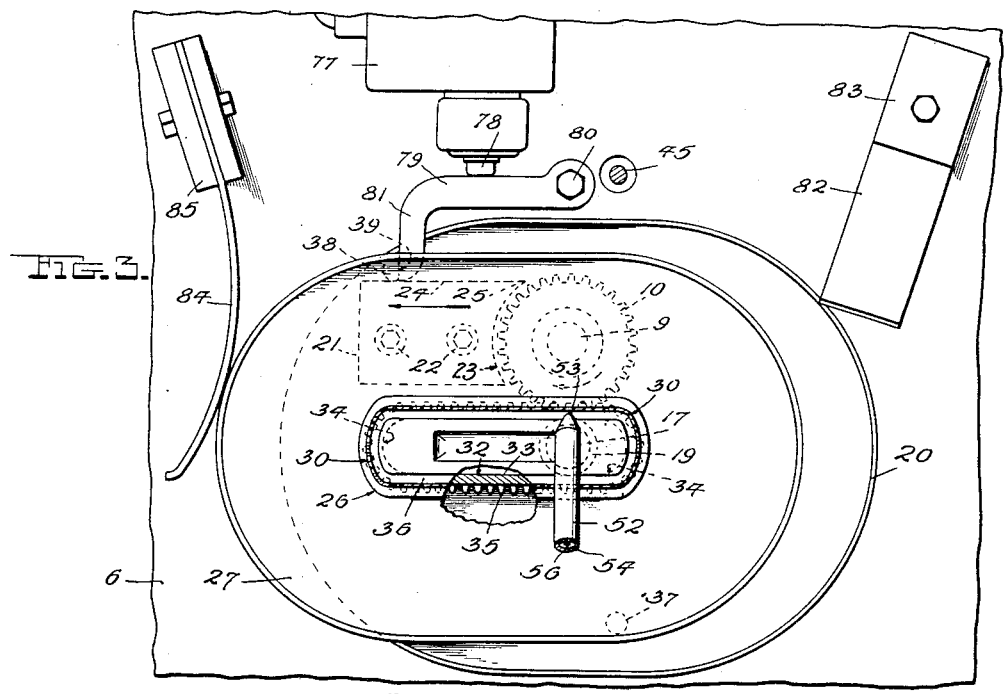
Figure 3 is a fragmentary plan view illustrating the initial placement of the chuck preparatory to commencing of a sealing compound applying cycle.

Rotation of the pinion 10 in intermeshing engagement with the rack portion 35 of the chuck unit causes said unit to travel in the direction illustrated in Figure 3 relative to the stationary nozzle 52, thereby causing the nozzle to apply sealing compound in the closure member groove 36 directly over the pitch line of the rack portion 35.

Figure 4:
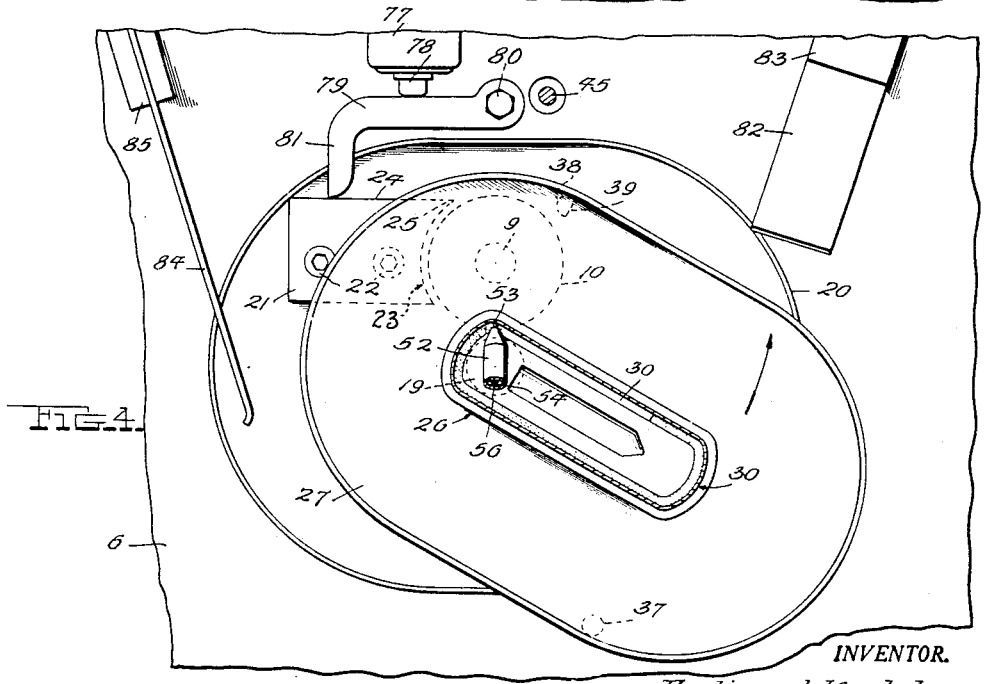
Figure 4 is a view similar to Figure 3 illustrating the parts in the process of applying the sealing compound to the chuck supported closure member.

Because of the irregular shape of the chuck and the attached guard plate 27 and the relation of the pinion 10 and the rack portion 35, there is a tendency for the free end of the guard plate remote from the point of application of the sealing compound to whip about as the chuck unit is being moved from the position illustrated in Figure 4 to the position illustrated in Figure 5. This whipping tendency is controlled by engagement of the control pin 38 with the guiding surface 24 of the guide block 21 after said pin passes the sharp nose 25 of said block. Prior to engagement of the pin with the block the whipping tendency is controlled by retarder springs 82 which are mounted as at 83 on the table 6 in position for having the guard plate flange 27 engaged between them. The diametrically oppositely disposed guide pin 37 also engages the guiding surface 24 of the block 21 for guiding movement of the chuck unit in the manner hereinabove described, but it will be noted that this pin is shorter than the control pin 38 so as to pass freely over the angle-bent end 81 of the switch actuator lever 79 without contacting the same.

As the chuck unit is approaching the position illustrated in Figure 5, the control pin 38 engages the switch actuator lever portion 81 and displaces the same in the manner illustrated, thereby applying the inward pressure on the switch button 78 which is effective to close the switch and energize the solenoid control circuit. The energizing of the solenoid causes a retraction of the core 73 and a releasing of the latch 67, thereby permitting the pitman 45, the lever 43 and the nozzle 52 to move upwardly. Upward movement of the lever 43 releases the pull rod 61 and permits the spring to close the needle valve 56 and terminate the dispensing of sealing compound, and upward movement of the pitman 45 releases the clutch and terminates rotation of the driver pinion 10. It is important to note, however, that the control pin 38 and the actuator lever 79, 81 are so constructed and cooperatively arranged that a slight amount of overrunning of the chuck unit is permitted after the point of initiation of the application of sealing compound of the closure member has been reached and before termination of the dispensing of the sealing compound and movement of the driver pinion 10 have been terminated, thus bringing about a slight overlapping of the end of the ring of sealing compound application over the start thereof, and assuring that a continuous ring of sealing compound, without voids therein, will be provided on each closure member.

It will be apparent by reference to Figure 6 of the drawings that the overrunning of the angle-bent end portion 81 of the switch actuator lever 79 by the control pin 38 causes the guard plate 27 to engage and store energy in a spring member 84 mounted as at 85 on the table 6, and this stored energy is effective after releasing of the clutch to impart reverse directional movement to the guard plate and chuck unit to restore the parts to the initial position illustrated in Figure 3 wherein the flat face 39 of the control pin 38 rests against the angle-bent end 81 of the switch actuator lever 79. The operator then removes the treated closure member from the chuck and replaces it with another closure member which is to have sealing compound applied thereon, and the above described cycle of operations is repeated.

The upward and downward movement of the pulley 11 for effecting the desired control of the driving of the pinion 10 is brought about by a fork member 86 which is secured as at 87 on the vertically reciprocable pitman 45 and engages in the annular groove 88 in said pulley.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, a chuck, means for removably holding a non-circular closure member on the chuck, a sealing compound dispensing nozzle, means for controlling the dispensing of sealing compound from said nozzle, means for moving the chuck and a closure member thereon relative to said nozzle in a manner for depositing a continuous non-circular ring of sealing compound on said closure, means for manually and approximately simultaneously initiating the movement of the chuck and the dispensing of the sealing compound, and means for automatically and approximately simultaneously terminating the chuck movement and the dispensing of the sealing compound upon completion of a single complete turn of said closure member.

2. In apparatus of the character described, a chuck, means for removably holding a non-circular closure member on the chuck, a sealing compound dispensing nozzle, means for controlling the dispensing of sealing compound from said nozzle, means for moving the chuck and a closure member thereon relative to said nozzle in a manner for depositing a continuous non-circular ring of sealing compound on said closure, means including a depressible treadle for manually and approximately simultaneously initiating the movement of the chuck and the dispensing of the sealing compound, and means for automatically and approximately simultaneously terminating the chuck movement and the dispensing of the sealing compound upon completion of a single complete turn of said closure member.

3. In apparatus of the character described, a chuck, means for removably holding a closure member on the chuck, a sealing compound dispensing nozzle, means for controlling the dispensing of sealing compound from said nozzle, a driver pinion, a roller spaced a limited distance from said pinion, said chuck including a rack flange having a moving fit between the roller and the pinion with its rack enmeshed with the pinion and generally conforming to the shape of the ring of sealing compound to be deposited on the closure member, and means for driving the pinion and causing the chuck and closure member to move relative to the nozzle for depositing a ring of sealing compound thereon generally conforming to the shape of the rack.

4. In apparatus of the character described, a chuck, means for removably holding a closure member on the chuck, a sealing compound dispensing nozzle, means for controlling the dispensing of sealing compound from said nozzle, a driver pinion, a roller spaced a limited distance from said pinion, said chuck including a rack flange having a moving fit between the roller and the pinion with its rack enmeshed with the pinion and generally conforming to the shape of the ring of sealing compound to be deposited on the closure member, means for manually initiating the movement of the pinion and the dispensing of the sealing compound, and means for automatically terminating the pinion movement and the dispensing of the sealing compound upon completion of a cycle of sealing compound application.

5. In apparatus of the character described, a chuck, means for removably holding a closure member on the chuck, a sealing compound dispensing nozzle, means for controlling the dispensing of sealing compound from said nozzle, a driver pinion, a roller spaced a limited distance from said pinion, said chuck including a rack flange having a moving fit between the roller and the pinion with its rack enmeshed with the pinion and generally conforming to the shape of the ring of sealing compound to be deposited on the closure member, pinion driving means including a clutch shiftable to initiate or terminate driving of the pinion, manually operable means for moving the nozzle into cooperative relation to the chuck and for shifting the clutch to initiate driving of the pinion, means for actuating the nozzle control means for initiating the dispensing of the sealing compound as the nozzle moves into cooperative relation to the chuck, and means for automatically shifting the clutch to terminate pinion and chuck movement and for withdrawing the nozzle from cooperative relation to the chuck and terminating the dispensing of sealing compound therefrom upon completion of a cycle of sealing compound application.

6. In apparatus of the character described, a chuck, means for removably holding a closure member on the chuck, a sealing compound dispensing nozzle, means for controlling the dispensing of sealing compound from said nozzle, a driver pinion, a roller spaced a limited distance from said pinion, said chuck including a rack flange having a moving fit between the roller and the pinion with its rack enmeshed with the pinion and generally conforming to the shape of the ring of sealing compound to be deposited on the closure member, pinion driving means including a clutch shiftable to initiate or terminate driving of the pinion, a manually operable lever depressible for moving the nozzle into cooperative relation to the chuck and for shifting the clutch to initiate driving of the pinion, means for latching the lever in its depressed position, means for actuating the nozzle control means for initiating the dispensing of the sealing compound as the nozzle moves into cooperative relation to the chuck, and latch tripping means including a control pin movable with the chuck and effective upon completion of a cycle of sealing compound application to cause the latching means to be tripped, the clutch to be disengaged and the nozzle to move out of cooperative relation to the chuck.

7. In apparatus of the character described, a chuck, means for removably holding a closure member on the chuck, a sealing compound dispensing nozzle, means for controlling the dispensing of sealing compound from said nozzle, a driver pinion, a roller spaced a limited distance from said pinion, said chuck including a rack flange having a moving fit between the roller and the pinion with its rack enmeshed with the pinion and generally conforming to the shape of the ring of sealing compound to be deposited on the closure member, pinion driving means including a clutch shiftable to initiate or terminate driving of the pinion, a manually operable lever depressible for moving the nozzle into cooperative relation to the chuck and for shifting the clutch to initiate driving of the pinion, means for latching the lever in its depressed position, means for actuating the nozzle control means for initiating the dispensing of the sealing compound as the nozzle moves into cooperative relation to the chuck, a latch tripping solenoid, a solenoid control circuit including a control switch, a switch actuator lever, and a control pin movable with the chuck and effective upon completion of a cycle of sealing compound application to engage the switch actuator lever and cause it to actuate the switch to bring about a solenoid actuation tripping the latch whereby the clutch will be disengaged and the nozzle will be moved out of cooperative relation to the chuck.

8. Apparatus as defined in claim 7 in which the clutch shifting and nozzle withdrawing means are so constructed and arranged as to permit a slight overrunning of the chuck past the point of initiation of the sealing compound application.

so as to provide for a slight overlapping of the end of the ring of sealing compound application over the start thereof.

9. Apparatus as defined in claim 7 in which the clutch shifting and nozzle withdrawing means are so constructed and arranged as to permit a slight overrunning of the chuck past the point of initiation of the sealing compound application so as to provide for a slight overlapping of the end of the ring of sealing compound application over the start thereof, and in which means is provided for moving the chuck back to the point at which the application of the sealing compound ring was initiated at the end of each cycle of compound application.

10. Apparatus as defined in claim 7 in which the control pin and the switch actuator lever are so constructed and cooperatively arranged that a slight overrunning of the chuck past the point of initiation of the sealing compound application will be permitted before the nozzle is displaced at the end of each cycle of compound application so as to provide for a slight overlapping of the end of the ring of sealing compound application over the start thereof, and in which means is provided for moving the chuck back to the point at which the application of the sealing compound ring was initiated at the end of each cycle of compound application.

11. In apparatus of the character described, a chuck having means for retaining thereon a closure member which is to have a ring of sealing compound applied thereon having two long parallel straight sides and generally arcuate ends, a sealing compound dispensing nozzle, means for controlling the dispensing of sealing compound from said nozzle, a driver pinion, a roller spaced a limited distance from said pinion, said chuck including a rack flange having a moving fit between the roller and the pinion with its rack enmeshed with the pinion and straight parallel sides and half circular ends generally conforming to the beforementioned shape of the sealing compound ring, said nozzle being disposed to dispense the sealing compound at a point approximately over the rack and between the roller and the pinion, guide means for causing each straight side of the rack to travel tangentially with respect to the pinion and perpendicularly with respect to a line drawn through the axes of the pinion and the roller, and means for driving said pinion.

12. Apparatus as defined in claim 11 in which the guide means includes a stationary block having a straight face extending tangentially away from the pinion, and two guide pins movable with the chuck one thereof being disposed opposite the leading end of each of the straight sides of the rack.

13. Apparatus as defined in claim 11 in which there is included a guard plate movable with the chuck in position for overlying the pinion in all positions of the chuck, and in which the guide means includes a stationary block having a straight face extending tangentially away from the pinion, and two guide pins depending from the guard plate one disposed opposite the leading end of each of the straight sides of the rack.

14. Apparatus as defined in claim 11 in which there is included a guard plate movable with the chuck in position for overlying the pinion in all positions of the chuck, and in which the guide means includes a stationary block having a straight face extending tangentially away from the pinion, and two guide pins depending from the guard plate one disposed opposite the leading end of each of the straight sides of the rack, and in which there is also included means engageable by the guard plate for retarding whipping about of the guard plate and chuck as the respective guide pins move out of guiding contact with the guide block.

15. Apparatus as defined in claim 11 in which there is included a guard plate movable with the chuck in position for overlying the pinion in all positions of the chuck, and in which the guide means includes a stationary block having a straight face extending tangentially away from the pinion, and two guide pins depending from the guard plate one disposed opposite the leading end of each of the straight sides of the rack, and in which there is also included friction gripping spring means engageable by the guard plate for retarding whipping about of the guard plate and chuck as the respective guide pins move out of guiding contact with the guide block.

16. Apparatus as defined in claim 11 in which the pinion driving means includes a clutch shiftable to initiate or terminate driving of the pinion, and in which there are included a manually operable lever depressible for moving the nozzle into cooperative relation to the chuck and for shifting the clutch to initiate driving of the pinion, means for latching the lever in its depressed position, means for actuating the nozzle control means for initiating the dispensing of the sealing compound as the nozzle moves into cooperative relation to the chuck, and latch tripping means including a control pin movable with the chuck and effective upon completion of a cycle of sealing compound application to cause the latching means to be tripped, the clutch to be disengaged and the nozzle to move out of cooperative relation to the chuck.

17. Apparatus are defined in claim 11 in which there is included a guard plate movable with the chuck in position for overlying the pinion in all positions of the chuck, and in which the guide means includes a stationary block having a straight face extending tangentially away from the pinion, and two guide pins depending from the guard plate one disposed opposite the leading end of each of the straight sides of the rack, in which the pinion driving means includes a clutch shiftable to initiate or terminate driving of the pinion, and in which there are included a manually operable lever depressible for moving the nozzle into cooperative relation to the chuck and for shifting the clutch to initiate driving of the pinion, means for latching the lever in its depressed position, means for actuating the nozzle control means for initiating the dispensing of the sealing compound as the nozzle moves into cooperative relation to the chuck, and latch tripping means operable by one of the guide pins upon completion of a cycle of sealing compound application to cause the latching means to be tripped, the clutch to be disengaged and the nozzle to move out of cooperative relation to the chuck.

18. Apparatus as defined in claim 11 in which there is included a guard plate movable with the chuck in position for overlying the pinion in all positions of the chuck, and in which the guide means includes a stationary block having a straight face extending tangentially away from the pinion, and two guide pins depending from the guard plate one disposed opposite the leading end of each of the straight sides of the rack, in which the pinion driving means includes a clutch shiftable to initiate or terminate driving of the pinion, and in which there are included a manually operable lever depressible for moving the nozzle into cooperative relation to the chuck and for shifting the clutch to initiate driving of the pinion, means for latching the lever in its depressed position, means for actuating the nozzle control means for initiating the dispensing of the sealing compound as the nozzle moves into cooperative relation to the chuck, a latch tripping solenoid, a solenoid control circuit including a control switch, a switch actuator lever operable by one of the guide pins upon completion of a cycle of sealing compound application to cause the latching means to be tripped, the clutch to be disengaged and the nozzle to move out of cooperative relation to the chuck, said one pin and the switch actuator lever being so constructed and cooperatively arranged that a slight overrunning of the chuck past the point of initiation of the sealing compound application will be permitted before the nozzle is displaced at the end of each cycle of compound application so as to provide for a slight overlapping of the end of the ring of sealing compound application over the start thereof, and means for engaging the guard plate and moving the chuck back to the point at which the application of the sealing compound was initiated at the end of each cycle of compound application, said point being determined by engagement of said one pin against said switch actuator lever.

FERDINAND KASTEL.

REFERENCES CITED

The following references are of record in the file of this patent:

UNITED STATES PATENTS

| Number | Name | Date |
|---|---|---|
| 2,150,462 | Schultz et al. | Mar. 14, 1939 |
| 822,342 | Brenzinger | June 5, 1906 |
| 1,318,935 | Thornburgh | Oct. 14, 1919 |
| 1,347,483 | Brenzinger | July 20, 1920 |
| 1,141,339 | Hodgson | June 1, 1915 |
| 1,474,999 | Coates | Nov. 20, 1923 |
| 2,287,356 | Newman | June 23, 1942 |